United States Patent [19]

Bennitt

[11] Patent Number: 5,062,311
[45] Date of Patent: Nov. 5, 1991

[54] FRAME, CRANKSHAFT AND CROSSHEAD ASSEMBLY, AND A CRANKSHAFT AND CROSSHEAD FRAME, FOR A RECIPROCATING-PISTON MACHINE

[75] Inventor: Robert A. Bennitt, Painted Post, N.Y.
[73] Assignee: Dresser-Rand Company, Corning, N.Y.
[21] Appl. No.: 677,698
[22] Filed: Mar. 29, 1991
[51] Int. Cl.⁵ ............................................. F16H 21/22
[52] U.S. Cl. ......................................... 74/44; 74/603; 74/605; 384/11
[58] Field of Search ...................... 384/11; 74/44, 595, 74/596, 603, 605

[56] References Cited

U.S. PATENT DOCUMENTS

| | | | |
|---|---|---|---|
| 2,440,812 | 5/1948 | Simpson | 74/605 |
| 3,768,335 | 10/1973 | Mayer | 74/605 X |
| 4,576,060 | 3/1986 | Gristina | 74/603 X |
| 4,611,503 | 9/1986 | Kocher | 74/603 |
| 4,624,156 | 11/1986 | Kamata | 74/595 |
| 4,872,395 | 10/1989 | Bennitt et al. | 74/44 X |

FOREIGN PATENT DOCUMENTS 1924773 11/1969 Fed. Rep. of Germany ........ 384/11

Primary Examiner—Allan D. Herrmann
Assistant Examiner—Ryan W. Massey
Attorney, Agent, or Firm—Bernard J. Murphy

[57] ABSTRACT

A housing, feet therefor, and casings, formed of common, readily available tubular stock, of uniform thickness, are assembled and welded together to define a frame for a crankshaft and crosshead assemblies. The tubular housing has openings in the sides thereof in which to receive the casings, and has apertures, also in sides thereof, in which to journal a crankshaft. The casings include transverse webs with arcuate ways formed therein for slidably supporting crosshead shoes thereon.

17 Claims, 3 Drawing Sheets

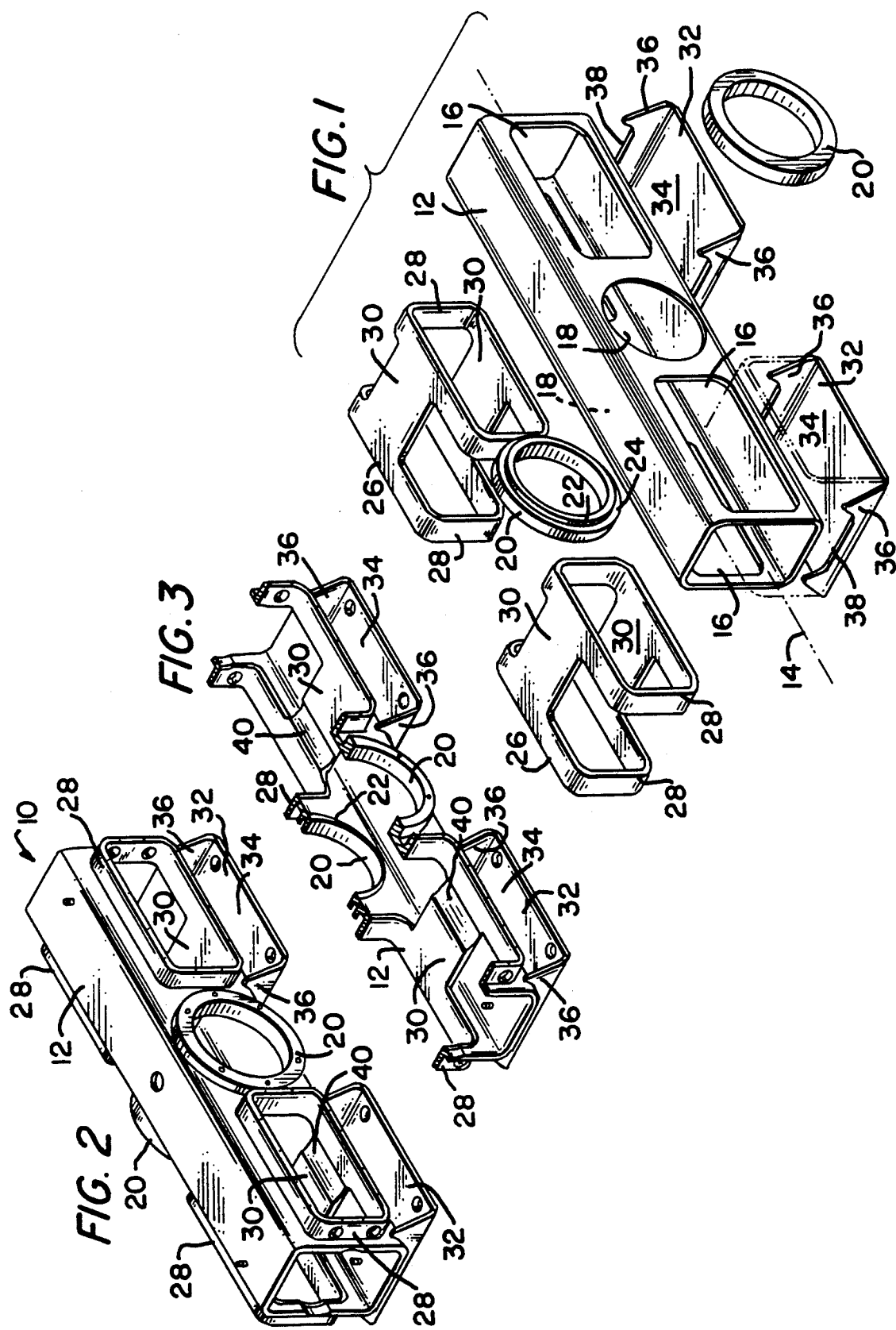

FRAME, CRANKSHAFT AND CROSSHEAD ASSEMBLY, AND A CRANKSHAFT AND CROSSHEAD FRAME, FOR A RECIPROCATING-PISTON MACHINE

BACKGROUND OF THE INVENTION

This invention pertains to reciprocating-piston machines, such as gas compressors, and the like, and in particular to a frame, crankshaft and crosshead assembly, and to a crankshaft and crosshead frame for such machines.

Frames, crankshafts and crosshead arrangements for reciprocating-piston machines typically involve expensive castings and machining of components and parts, and yield ponderous end products.

SUMMARY OF THE INVENTION

It is an object of this invention to set forth configurations of (a) a frame, crankshaft and crosshead assembly, and (b) a crankshaft and crosshead frame, for a reciprocating-piston machine, which entail minimal cost, ease of manufacturing, have simplified lubrication, and constitute low-weight end products, albeit of sturdy and reliable construction.

Particularly, it is an object of this invention to set forth a frame, crankshaft and crosshead assembly for a reciprocating-piston machine, comprising a tubular housing; and means fixed to said housing for supporting said housing along a given, longitudinal axis; wherein said housing has apertures formed therein; and including a crankshaft journalled in said apertures; wherein said housing further has openings formed therein; and including casings fixed in said openings; and a crosshead subassembly coupled to said crankshaft; wherein said casings have webs upon which, slidably, said subassembly is supported.

It is also an object of this invention to set forth a crankshaft and crosshead frame, for a reciprocating-piston machine, comprising a tubular housing; wherein said housing has a longitudinal axis, and openings formed therein on opposite sides of said axis; and casings fixed in said openings; and wherein said casings have webs; and said webs have arcuate ways formed therein for slidably supporting crossheads thereupon.

Further objects of this invention, as well as the novel features thereof, will become apparent by reference to the following description, taken in conjunction with the accompanying figures, in which:

BRIEF DESCRIPTION OF THE DRAWINGS

FIG. 1 is an exploded view, in perspective, of the novel frame, according to an embodiment thereof;

FIG. 2 is a perspective illustration of the assembled frame of FIG. 1;

FIG. 3 is a cross-sectional view of the frame of FIG. 2, the same taken along the horizontal plane of the longitudinal axis thereof;

DESCRIPTION OF THE PREFERRED EMBODIMENT

Figure 4:
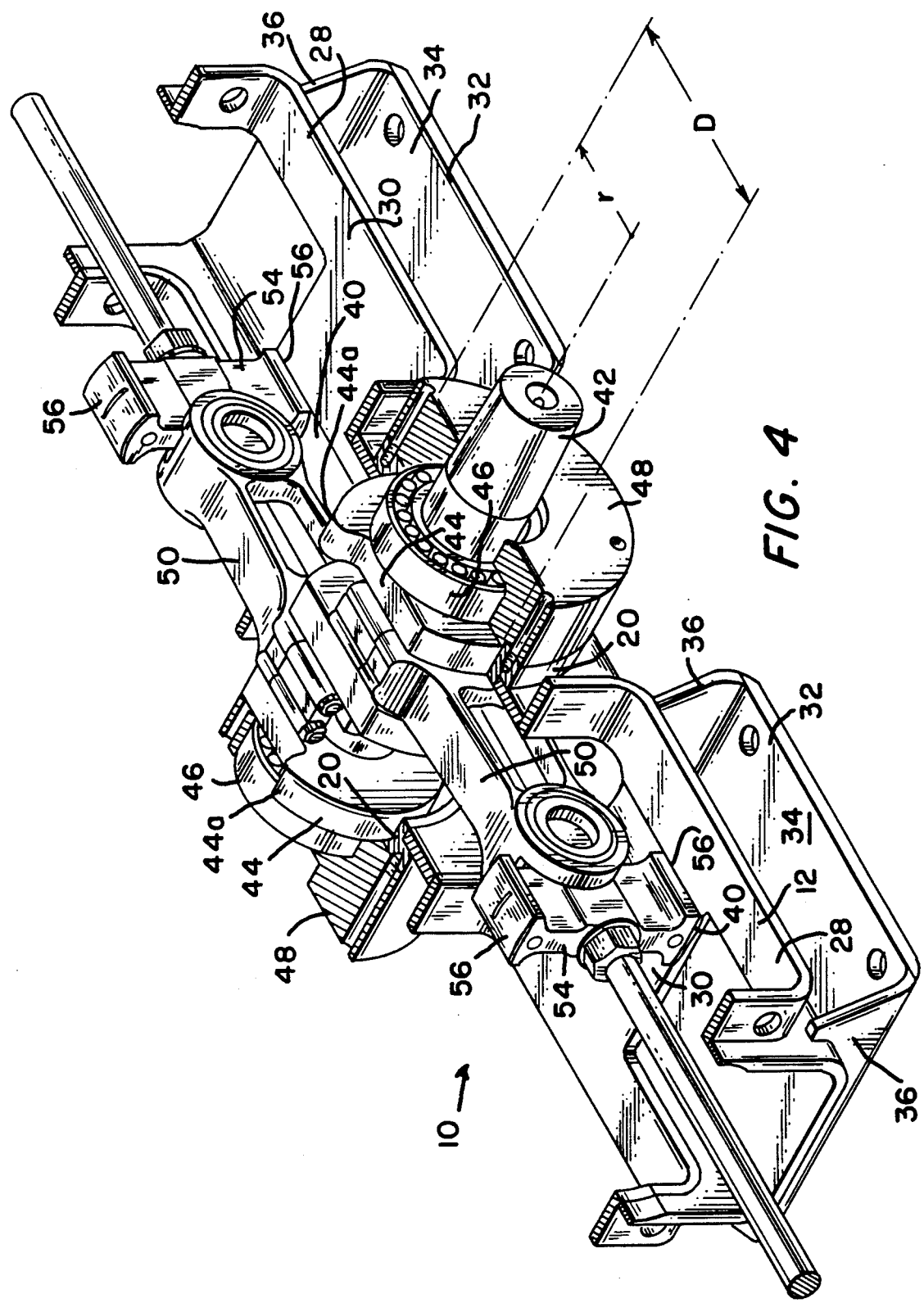
FIG. 4 is an enlarged view of the cross-sectioned frame of FIG. 3, showing, however, the crankshaft and crosshead assembly in place, according to the invention.

As shown in FIG. 1, the novel frame 10 comprises a tubular housing 12 of substantially rectangular cross-section, which has a longitudinal axis 14 and openings 16 formed therein on opposite sides of the axis 14, as well as apertures 18 (a) on opposite sides of said axis 14 and (b) intermediate the openings 16. The apertures 18 receive therein annuli 20 which have annular lips 22 and circular lands 24. The lips 22 are nestedly received in the apertures, and the lands 24 set against the outer peripheries of the apertures 18.

Casings 26, also of substantially rectangular cross-section, are received in the openings 16. The casings 26 comprise substantially rectangular frameworks 28 which are fixed in spaced-apart parallelism by integral webs 30. The casings 26 are set into the openings 16 with the innermost edges, i.e., the mutually confronting edges, of the frameworks 28 resting in the openings 16, and the rest of the frameworks 28 extending outwardly from the openings 16. Consequently, the webs 30 bridge across the interior of the housing 12.

The housing 12 and the casings 26 are inexpensively fabricated from common, tubular stock of uniform thickness. Upon the casings 26 being set into the openings 16, they are welded in place.

To support the housing 12 on the axis 14, a pair of feet 32 are provided. The latter have flat bases 34 and right-angularly-extending ledges 36, with reliefs 38 formed therein in which to receive the housing 12. The feet 32, too, are welded in place. The feet 32, as shown in phantom in FIG. 1, are also formable from such same, common, tubular stock of uniform thickness.

As just described, the frame 10 is assembled, with the annuli 20 being welded in place, in the apertures 18. Thereafter, the annuli 20 are bored and tapped, about the outermost facing thereof, to receive fasteners with which to secure bearing housings thereto. The outermost edges of the frameworks 28 are also bored and tapped to receive covers (not shown in FIG. 1) thereat. Too, the bases 34 of the feet 32 are bolt-holed to accommodate mounting bolts. Also, the webs 30 each have an arcuate way 40 formed therein, longitudinally parallel with the axis 14.

The assembled frame 10 is as shown in FIG. 2; FIG. 3 shows the assembled frame 10 cross-sectioned along the horizontal plane of the axis 14.

FIG. 4 shows the frame 10, as depicted in FIG. 3, albeit in greater scale, and with the crankshaft and crosshead assembly in place therein. The crankshaft 42 has counterweights 44 integral therewith, and the counterweights 44 are journalled in the annuli 20, in that the counterweights each have a given, greatest diameter "D" defined by a common radius "r". Each counterweight 44 has a weighting lobe 44a which is within the diameter "D". Bearings 46, captive in bearing housings 48, also journal the crankshaft 42, the housings 48 being fastened to the annuli 20.

Figure 5:
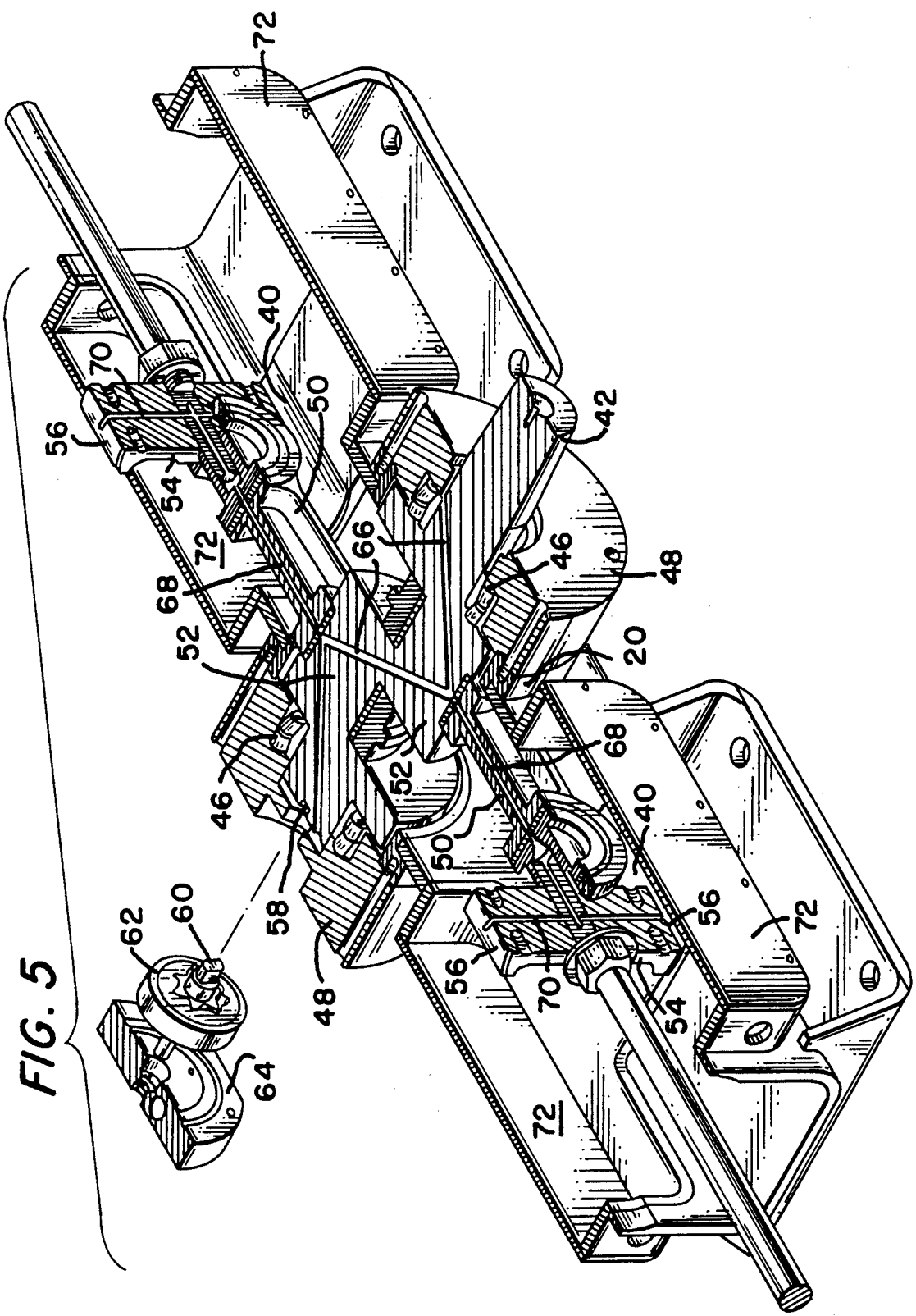
FIG. 5 is an illustration in the same scale as FIG. 4, showing the crankshaft and crosshead assembly also cross-sectioned, to depict the lubrication arrangement, and having a lubrication pump and drive assembly represented therein and exploded from the drive connection therefor in the crankshaft.

Crosshead/connecting rod subassemblies 50 are coupled to throws 52 (FIG. 5), and comprise upper and lower shoes 54 with arcuate bearing surfaces 56. The latter, the bearing surfaces 56, are slidably received by the ways 40. Lubrication for the frame, crankshaft and subassemblies 50, is depicted in FIG. 5. An end of the crankshaft 42 has a rectilinear relief 58 formed therein to receive the rectilinear end of an oil pump shaft 60. The end of the shaft 60 is set into the relief 58, and the oil pump 62 and cover 64 are nested in, and fastened in, respectively, the bearing housing 48 thereat. The crankshaft 42 has lubrication passageways 66 for formed therewithin, for communication with the pump 62 and conduct of lubricant to the bearings 46 and the subassemblies 50. Too, the latter subassemblies have similar passageways 68 formed therein, and the shoes 54 have further passageways 70 formed therein for conducting lubricant to the bearing surfaces 56. As shown (FIG. 5) covers 72 are fastened to the frameworks 28.

While I have described my invention in connection with a specific embodiment of a frame, crankshaft and crosshead/connecting rod subassembly, and in connection with a frame for a crankshaft and crosshead/connecting rod subassembly of given embodiment, it is to be clearly understood that this is done only by way of example, and not as a limitation to the scope of the invention, as set forth in the objects thereof and in the appended claims. The invention comprehends a singularly inexpensive construction, particularly through the use of common, readily available, tubular stock of uniform thickness. It is simplified as to construction and maintenance, and is of uncommonly light weight. Too, as is evident from the foregoing, machining for the invention is quite minimal.

I claim:

1. A frame, crankshaft and crosshead assembly for a reciprocating-piston machine, comprising:
   a tubular housing; and
   means fixed to said housing for supporting said housing along a given, longitudinal axis; wherein
   said housing has apertures formed therein; and including
   a crankshaft journalled in said apertures; wherein
   said housing further has openings formed therein; and including
   casings fixed in said openings; and
   a crosshead subassembly coupled to said crankshaft; wherein
   said casings have webs upon which, slidably, said subassembly is supported.

2. An assembly, according to claim 1, wherein:
   said subassembly has crossheads with arcuate shoes; and
   said webs have arcuate ways, formed therein, for slidably receiving said shoes thereon.

3. An assembly, according to claim 2, wherein:
   said ways extend, longitudinally, on opposite sides of, and parallel with, said given axis.

4. An assembly, according to claim 1, wherein:
   said casings, housing, and supporting means are all formed from common tubular stock of uniform thickness.

5. An assembly, according to claim 1, wherein:
   said crankshaft has counterweights integral therewith;
   each said counterweight has a given, greatest diameter defined by a common radius.

6. An assembly, according to claim 5, further including:
   annuli fixed in said apertures; and wherein said counterweights are journalled in said annuli.

7. An assembly, according to claim 6, further including:
   bearing housings fastened to said annuli; and
   bearings disposed within said bearing housings; and wherein opposite ends of said crankshaft are set within said bearings.

8. An assembly, according to claim 1, wherein:
   said crankshaft has a plurality of throws;
   said subassembly has a plurality of connecting rods; and
   each of said rods is connected to one of said throws.

9. An assembly, according to claim 1, wherein:
   said subassembly has lubrication passageways formed wholly therewithin.

10. An assembly, according to claim 9, wherein:
    an end of said crankshaft has a relief formed therein for drivingly receiving an oil pump shaft therewithin; and
    said crankshaft has lubrication passageways formed wholly therewithin for communication with an oil pump, upon such being shaft-driven by said crankshaft relief, and communication with said passageways formed within said subassembly.

11. A crankshaft and crosshead frame, for a reciprocating-piston machine, comprising:
    a tubular housing; wherein
    said housing has a longitudinal axis, and openings formed therein on opposite sides of said axis; and
    casings fixed in said openings; and wherein
    said casings have webs; and
    said webs have arcuate ways formed therein for slidably supporting crossheads thereupon.

12. A frame, according to claim 11, wherein:
    said housing further has apertures formed therein (a) on opposite sides of said axis and (b) intermediate said openings, for journalling a crankshaft therewithin.

13. A frame, according to claim 12, further including:
    annuli fixed in said apertures for journalling a crankshaft therein.

14. A frame, according to claim 11, wherein:
    said ways extend, longitudinally, on opposite sides of, and parallel with, said axis.

15. A frame, according to claim 11, wherein:
    said housing and said casings are formed from common tubular stock of uniform thickness.

16. A frame, according to claim 15, further including:
    means fixed to said housing for supporting said housing along said longitudinal axis.

17. A frame, according to claim 11, wherein:
    said casings comprise substantially rectangular frameworks which are fixed in spaced-apart parallelism by said webs.

* * * * *